US009189369B1

(12) United States Patent
Giardina et al.

(10) Patent No.: US 9,189,369 B1
(45) Date of Patent: Nov. 17, 2015

(54) SYSTEMS, METHODS AND COMPUTER PROGRAM PRODUCTS FOR AN AUTOMATED TEST FRAMEWORK

(71) Applicant: CA, Inc., Islandia, NY (US)

(72) Inventors: Nathan J. Giardina, San Diego, CA (US); Beau Croteau, Bay Shore, NY (US); David S. Tyree, Denver, CO (US); Robert Hucik, Simi Valley, CA (US)

(73) Assignee: CA, Inc., New York, NY (US)

( * ) Notice: Subject to any disclaimer, the term of this patent is extended or adjusted under 35 U.S.C. 154(b) by 246 days.

(21) Appl. No.: 13/793,125

(22) Filed: Mar. 11, 2013

(51) Int. Cl.
*G06F 11/00* (2006.01)
*G06F 11/36* (2006.01)

(52) U.S. Cl.
CPC .................................. *G06F 11/3668* (2013.01)

(58) Field of Classification Search
CPC ... G06F 9/4425; G06F 9/4433; G06F 9/4436; G06F 8/10; G06F 8/34
USPC ............. 717/125, 131, 141; 711/216; 714/25, 714/708, 741
See application file for complete search history.

(56) References Cited

U.S. PATENT DOCUMENTS

| | | | | |
|---|---|---|---|---|
| 5,130,936 A * | 7/1992 | Sheppard et al. | ............. | 702/123 |
| 5,193,178 A * | 3/1993 | Chillarege et al. | ............... | 714/25 |
| 5,371,883 A * | 12/1994 | Gross et al. | ................... | 714/38.1 |
| 5,412,801 A * | 5/1995 | de Remer et al. | ................ | 714/20 |
| 5,557,539 A * | 9/1996 | Fitch | .............................. | 709/206 |
| 5,671,351 A * | 9/1997 | Wild et al. | .................. | 714/38.13 |
| 5,673,387 A * | 9/1997 | Chen et al. | .................... | 714/38.1 |
| 5,734,863 A * | 3/1998 | Kodosky et al. | ................. | 703/27 |
| 5,751,941 A * | 5/1998 | Hinds et al. | ................. | 714/38.14 |
| 5,831,998 A * | 11/1998 | Ozmizrak | ...................... | 714/741 |
| 5,892,947 A * | 4/1999 | DeLong et al. | ............... | 717/100 |
| 5,960,457 A * | 9/1999 | Skrovan et al. | ............... | 711/146 |
| 6,011,830 A * | 1/2000 | Sasin et al. | ................. | 379/10.03 |
| 6,031,990 A * | 2/2000 | Sivakumar et al. | ............ | 717/124 |
| 6,088,690 A * | 7/2000 | Gounares et al. | ................ | 706/13 |
| 6,148,427 A * | 11/2000 | Sherwood et al. | ............. | 714/738 |
| 6,182,245 B1 * | 1/2001 | Akin et al. | ................. | 714/38.14 |
| 6,219,829 B1 * | 4/2001 | Sivakumar et al. | ........... | 717/131 |
| 6,715,108 B1 * | 3/2004 | Badger et al. | ................ | 714/38.1 |
| 7,895,490 B2 * | 2/2011 | Gass et al. | ..................... | 714/732 |
| 8,079,013 B1 * | 12/2011 | Ma et al. | ........................ | 716/139 |
| 8,805,651 B1 * | 8/2014 | Bartlett et al. | ..................... | 703/2 |
| 2001/0052089 A1 * | 12/2001 | Gustavsson et al. | ............ | 714/38 |
| 2003/0018932 A1 * | 1/2003 | Blum et al. | ..................... | 714/46 |
| 2003/0037314 A1 * | 2/2003 | Apuzzo et al. | ................ | 717/125 |
| 2004/0025088 A1 * | 2/2004 | Avvari et al. | .................... | 714/38 |
| 2004/0088677 A1 * | 5/2004 | Williams | ...................... | 717/104 |

(Continued)

FOREIGN PATENT DOCUMENTS

JP 2012141231 A * 7/2012

*Primary Examiner* — Bryce Bonzo
*Assistant Examiner* — Jeison C Arcos
(74) *Attorney, Agent, or Firm* — Myers Bigel Sibley & Sajovec, P.A.

(57) ABSTRACT

A first input, a first function and a corresponding first output type of a first test of programming code are stored. The first output type results from execution of the first function with the first input for the first test of programming code. It is determined whether a second input type for a second test of programming code matches the first output type stored in the data source. If the second input type matches the first output type, the first function is executed with the first input so that the second test is performed using an output of the first function as the second input.

20 Claims, 6 Drawing Sheets

(56) References Cited

U.S. PATENT DOCUMENTS

2004/0181713 A1* 9/2004 Lambert .................... 714/48
2004/0205436 A1* 10/2004 Kundu et al. ............... 714/741
2005/0154939 A1* 7/2005 De Pauw et al. ............ 714/25
2009/0292964 A1* 11/2009 Gass et al. .................. 714/736
2011/0208469 A1* 8/2011 Sheye ......................... 702/123
2012/0185729 A1* 7/2012 Bhatt et al. .................. 714/32

* cited by examiner

SYSTEMS, METHODS AND COMPUTER PROGRAM PRODUCTS FOR AN AUTOMATED TEST FRAMEWORK

TECHNICAL FIELD

The present disclosure relates generally to computer networks, software applications and software testing.

BACKGROUND

Writing tests for software is often a tedious process. Writing tests for a complex system with complex input structures is also difficult and requires increasingly large portions of code. Such test code may require redundant portions of code or global lists of defined inputs.

BRIEF SUMMARY

According to some embodiments of the disclosure, a first input, a first function and a corresponding first output type are stored. They may be stored in a data source. The first output type results from execution of the first function with the first input for a first test of operation of computer code. It is determined whether a second input type for a second test of operation of computer code matches the first output type. In response to a determination that the second input type matches the first output type, the first function is executed with the first input. The second test is performed using a first output of the executing of the first function as a second input. The first output may be an object of the first output type.

According to some embodiments, the first output may be stored in the data source. It is determined whether a third input type for the second test of operation of computer code matches the first output type. The first output is obtained in response to a determination that the third input type matches the first output type. The third test is performed using the first output as a third input.

According to some embodiments, the second test comprises executing a second function with the first output of the executing of the first function as the second input and validating a second output of the second function. In a further embodiment, the second input, the second function and a corresponding second output type are stored. The second output type results from execution of the second function with the second input for the second test of operation of computer code. It is determined whether a third input type for a third test of operation of computer code matches the second output type. In response to a determination that the third input type matches the second output type, the second function is executed with the second input. The third test is performed using a second output of the executing of the second function as a third input.

Some other embodiments are directed to related methods, systems and computer program products.

It is noted that aspects described with respect to one embodiment may be incorporated in different embodiments although not specifically described relative thereto. That is, all embodiments and/or features of any embodiments can be combined in any way and/or combination. Moreover, other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

Embodiments of the present disclosure are illustrated by way of example and are not limited by the accompanying figures with like references indicating like elements.

DETAILED DESCRIPTION

Embodiments of the present disclosure will be described more fully hereinafter with reference to the accompanying drawings. Other embodiments may take many different forms and should not be construed as limited to the embodiments set forth herein. Like numbers refer to like elements throughout.

The terminology used herein is for the purpose of describing particular embodiments only and is not intended to be limiting to other embodiments. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and will not be interpreted in an idealized or overly formal sense unless expressly so defined herein.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented as entirely hardware, entirely software (including firmware, resident software, micro-code, etc.) or combined software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Writing tests for software is tedious and can involve large portions of code. When different tests use the same objects or inputs, the test code requires that valid inputs and objects be defined for each portion of the test code. This may include extra lines of code to create these same objects or verify that previous inputs are again valid.

Figure 1:
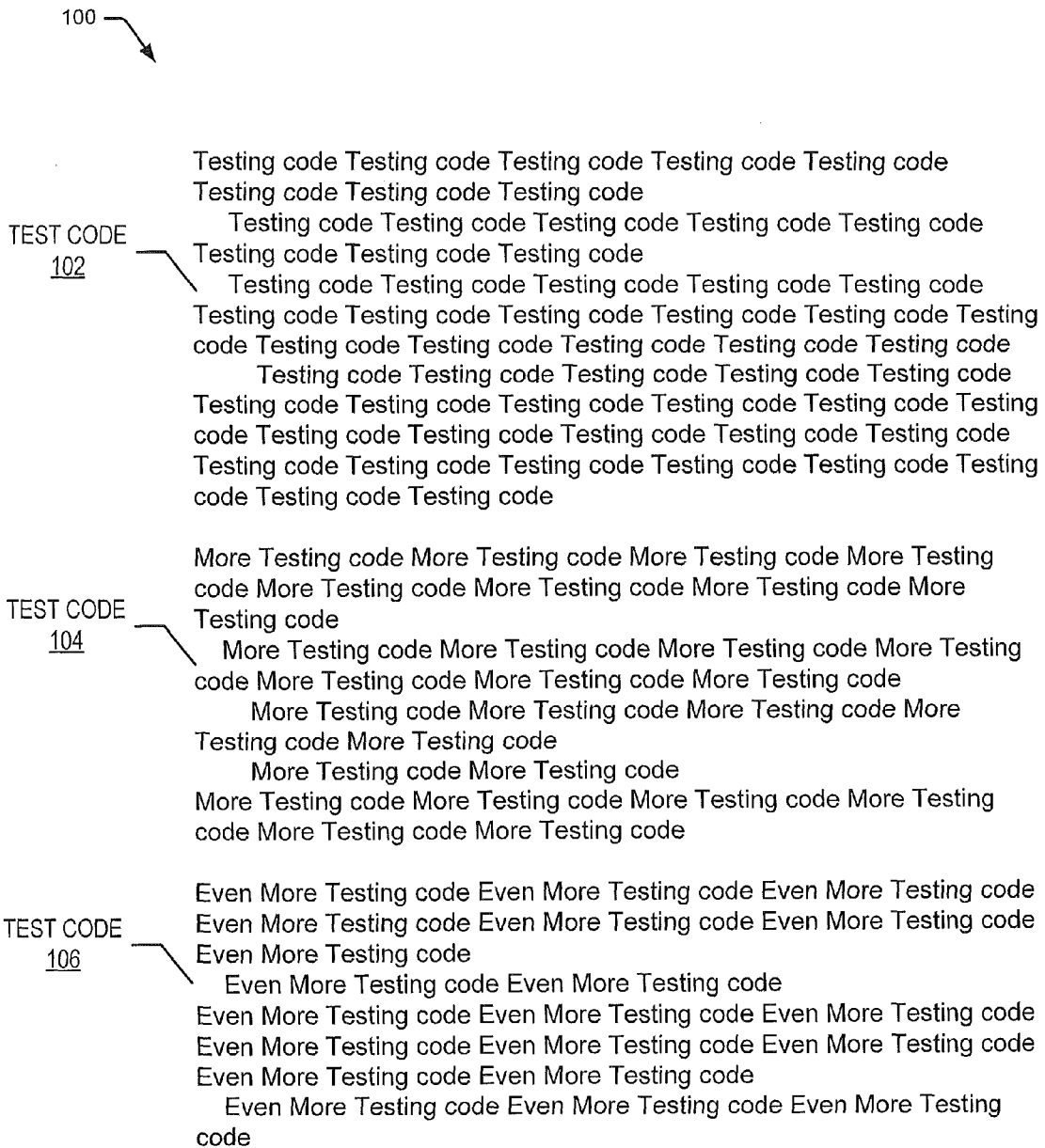
FIG. 1 illustrates a code view for an existing method of testing software.

For example, FIG. 1 illustrates a representation 100 of code view according to existing methods of software testing. Test code 102 may use inputs determined to be valid and output an object of a certain type. Test code 104 may also require the valid inputs but such inputs need to be defined or verified each time the code is written and the input objects have to be created as necessary. Test code 106 may be added to the test code and may have to include code to use the same valid inputs or objects used by test codes 102 and 104. As illustrated in view 100, the amount of code increases as additional test code is added and it gets harder to keep track of the multitude of inputs that are to be utilized by the various test codes and any connections between the tests. Often, it becomes necessary to maintain a global list of defined inputs for test codes 102, 104, 106 or any other portions of test code.

The embodiments described herein describe a testing framework that utilizes stored knowledge of input values from past tests for use in future tests. Input values, related functions and the types of outputs created by the functions are stored. Inputs for a current test may be output values recreated from related stored functions. Previously verified values may be generated on the fly for tests. Early functions retain information about inputs and outputs for use in later functions. As such, knowledge of testing values may be accumulated.

Figure 2:
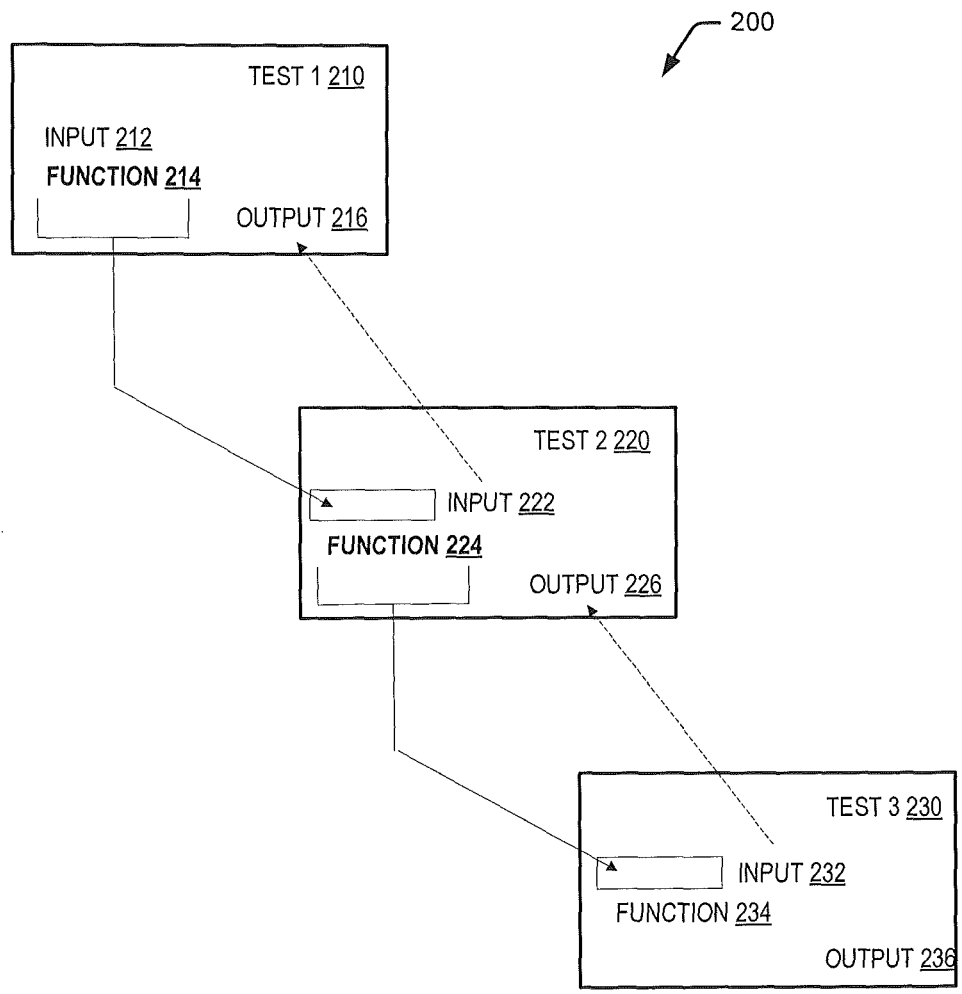
FIG. 2 is a block diagram illustrating a conceptual view of a system for testing software, according to various embodiments described herein.

FIG. 2 shows conceptual view 200 of a system for a test framework, according to various embodiments described herein. Test 1 210 includes function 214 that executes with input 212 and produces output 216. These may be stored in a database for future tests that utilize similar inputs of a type that match the type of output 216. For example, test 2 220 includes some test code, possibly including function 224 that requires input 222. Input 222 is of a type that matches the type of output 216 in a data source. Output 216 or an object of a type of output 216 may be used as input 222. Output 216 may be an object created by executing stored function 214 during the test run with valid input 212.

Likewise, test 3 230 may utilize output 226 of test 2 for input 232. Input 232 may use stored output 226 or an object of the type of output 226. Input 232 may also be an object created from executing stored function 224 with its obtained object for input 222. Function 234 will use the object created from stored function 224 as input 232. Output 236 may then be created. The accumulation of values connects the tests without use of additional connection code and without the use of a global list of inputs that are defined for each portion of test code.

The framework described by the embodiments herein allow programmers and/or test code to recreate objects as test inputs and test many functions without writing test script anew or writing complex code to connect the tests. Less coding will be involved compared to previous methods of testing software.

If an input for a test is provided, the input may be stored as well as the related function of the test. When performing any other test, the same input as well as the output from that test function may be utilized. This intrinsically involves a guess as to the nature of the connections between these tests.

Figure 3:
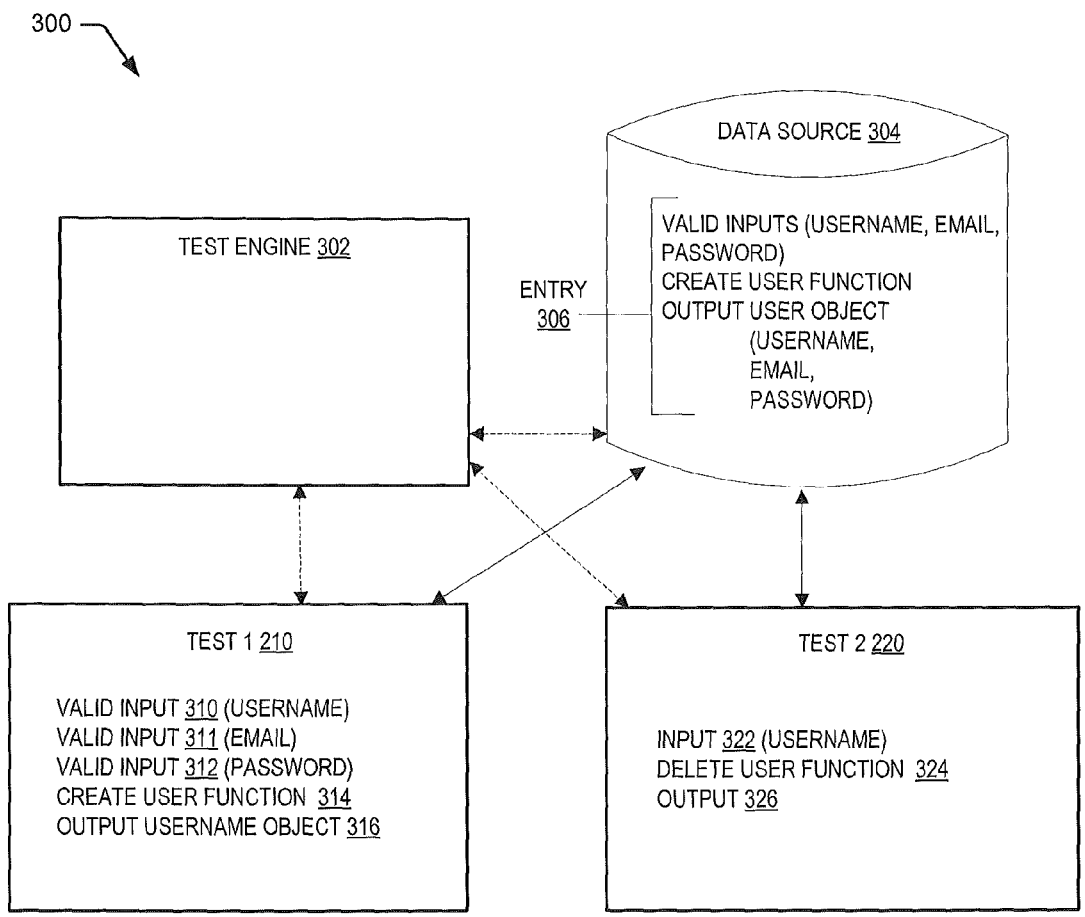
FIG. 3 is a block diagram illustrating a system for testing software, according to various embodiments described herein.

FIG. 3 shows example system 300 for a test framework, according to various embodiments described herein. System 300 shows test engine 302. Test engine 302 is implemented by a computing device and manages the testing of code. Test engine 302 may also perform the testing under the direction of a user. Test engine 302 works in coordination with data source 304, which is a data structure in a memory of a computing device. Data source 304 may include a database, hash tables, or any other data structure that allows for test code to lookup information for any previous test code. Data source 304 may be implemented on a computing device. Data source 304 may be separate from and/or external to a callstack, forward function and/or memory buffer for a current test and/or execution of computer code. Multiple entries may accumulate from multiple tests. Steps may be taken to avoid duplicate entries.

Test engine 302 manages test 1 210 and test 2 220. Tests may require valid inputs that will lead to accurate and/or positive results. In this example, test 1 210 uses valid inputs in a "create user" function 314. An API is defined for create user function 314. The function may involve three valid inputs 310-312, a username, an email and a password. Example code is shown below:

```
API.defineMethod("createUser", function(api){
api.post("createUser").demand("username").demand
   ("email").demand("pass");
});
```

A simple test for creating a user may be written:

```
TestAPI.doTest("createUser", function(api){
api.defineOutput("username", function(err, data){return
   data.username});
api.defineValidInput({username:"testuser",email:
   "test@test.com", pass: "test"});
});
```

The defineOutput indicates how a valid username is created and returned to the system. This may be stored in an input hashtable in data source 304 as an entry 306 by the name "username". The other valid input variables (email and password) can be stored as well via the same manner. For example, valid input 311 "email" in create user function 314 may output a structure that contains an email object or a user object with an email. All other tests that require an input of "email" can then lookup "email" in data source 304. Email and password inputs may also be entered into data source 304 as part of entry 306 and/or as a separate entry.

There may be second test 220 "deleteUser," which also has a defined API:

```
API.defineMethod("deleteUser", function(api){
api.post("deleteUser").demand("username");
});
```

When test 220 is performed, create user function 314 from entry 306 is looked up by type username. Create user function 314 is executed and its output object username will be used for test 220's input 322.

No definitions for the deleteUser method 324 are necessary as the only demand that it has is username, which test engine 302 already knows how to create via the input table entry 306. Hence a test of delete user can be run with known valid inputs to ensure that it works correctly. This dynamic ability to bootstrap tests dramatically reduces the amount of test code that must be written to provide proper test code coverage.

The ability to determine parameters to functions based on past inputs and using those inputs to test new functions without explicit test writing may be advantageous. Such advantages include: less overall testing code; easier and faster test creation; tests built into an API itself; and greater testing coverage.

Figure 4:
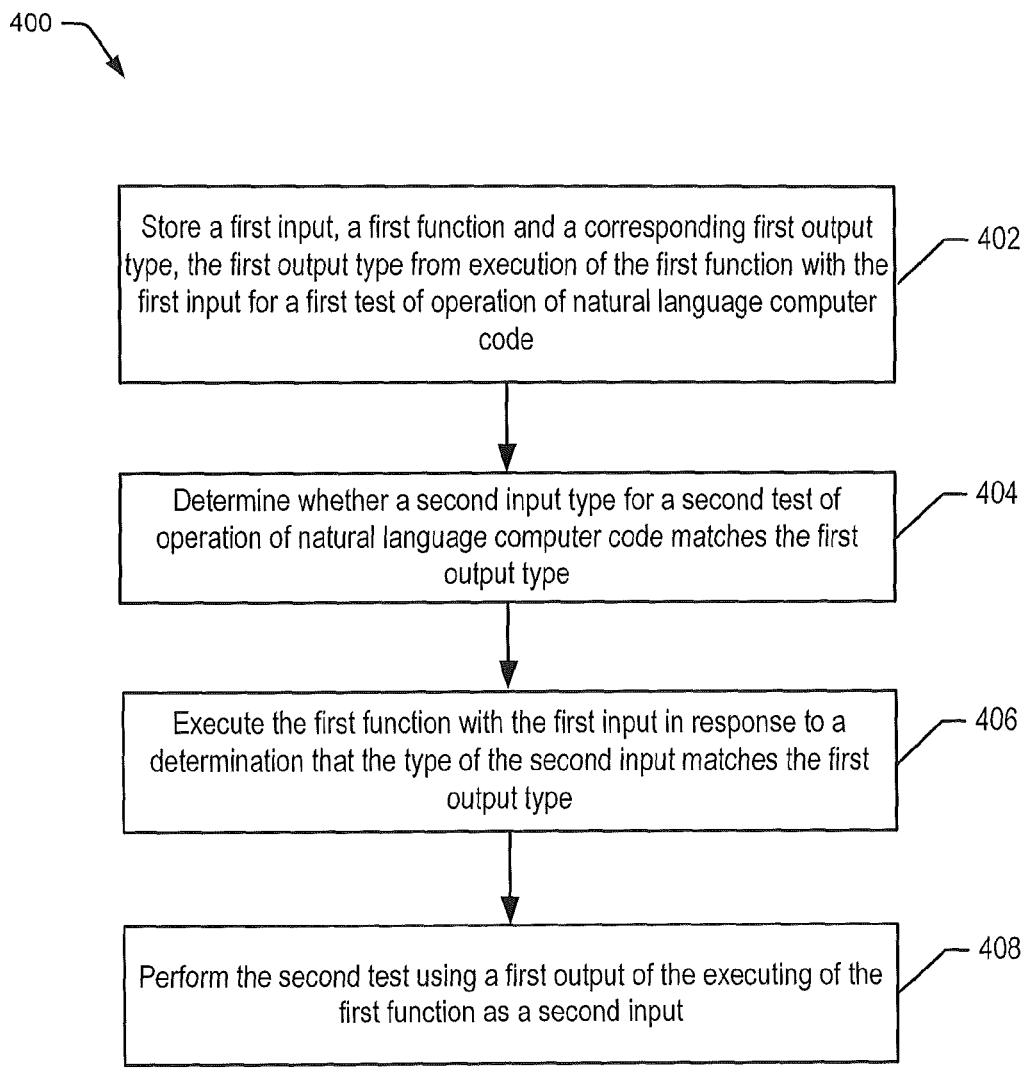
FIG. 4 is a block diagram illustrating a flowchart for testing software, according to various embodiments described herein.

FIG. 4 shows flowchart 400 that illustrates a process for testing code, according to various embodiments described herein. At block 402, a first input, a first function and a corresponding first output type are stored in a data source. The first output type results from execution of the first function with the first input for a first test of operation of computer code. The computer code may be natural language computer code. Natural language computer code may include any programming code that requires syntax in a sentence like form. As in the examples above, if a user object is to be passed around inside a user management tool, initial input values to create a user object, the function to create the user object, and the type of the user object may be stored for the multiple future tests.

At block 404, it is determined whether a second input type for a second test matches the first output type, which may be stored in the data source. The second test may involve another portion of programming code that includes or is separate from the programming code tested by the first test. Continuing with the previous example for block 402, when testing other functions such as a delete user or change password function that need a valid user object, test engine 302 may look up a user object type in a hash table that matches an input type to stored input and/or output types.

While input values can be matched to output values, it may be beneficial to match the type of input with the type of output. For example, if delete user function 324 needs a username input 322, it looks for an entry with the type of object that would provide the username. A user object that includes a username value of "John" is the type of object that is required by the second test. It is not as if test 2 220 needs to have an object with an actual username value of "John".

At block 406, the first function is executed with the first input when the second input type matches the first output type. This may be responsive to a determination that the second input type matches the first output type. If there is a match of stored output type to the current test input type, the stored valid inputs are used to call the stored create user function. Exact matches may be found. In some cases, matches may be determined based on similar values. Matches may be determined based on a name of an entry, a type of an entry and/or a value of an entry, among others.

At block 408, the second test is performed using, as the second input, the first output that results from execution of the first function. This may involve reproducing the code of function 314 in the data source and executing the code. This may also involve executing the code of function 314 in data source 304 or in an alternate location, such as in a scratchpad for executing stored code. Entries in data source 304 may also involve pointers to code that can be executed as if it were the stored function. The resulting example output of block 406, which may be a user object or username object, is used for an input of the second test. Performing the test may include executing the second test and validating an output of the second test.

In some cases, if a first test is performed, an output is stored and a subsequent use of the output is part of the same test or uninterrupted test run, then the stored output may be used for the input of the subsequent use rather than reexecuting the first stored function. In other words, if the username object is already created and there are multiple uses of the username object in the same test run, the username may be reused. However, if the username object is not created yet in a distinctly separate test, the username object may be created from scratch to avoid conflicts within the database.

The operations described in flowchart 400 are advantageous when a second test is to be run without an existing username object in the execution memory buffer for the second test. That is, entries in data source 304 are useful when a second test is working with a clean slate or is part of a new test run in a different realm, such as another application, portion of an application, function, and/or sub-routine. This new test run may be performed at a separate test execution time. It is likely that a first test verifies the operation of the first function and the resulting output. The first test function and output may then be relied upon in a second separate test run, where the code is written or included at a later time after execution of the first test.

If there are multiple inputs for the first test, then the other valid inputs may be used for later tests. For example, if a valid password is needed for other tests, then a valid password may be generated as part of the user or username output object.

As described in system 200 of FIG. 2, a second test may store inputs, functions and outputs that may be used by a third test. The third test may require an input that has a type that matches a stored output type of the second test. The second test may be executed to produce the object of the type required for the input of the third test. The third test may be performed using the generated output for the input.

In an example, there may be crosstalk between ten API calls. Some may be phantom calls while some may require three or four pieces of information from other calls. As testing expands from the basic case, other tests build on that knowledge. If additional code to be tested includes adding a picture, setting a new password and other such functions, testing of each of these test code portions may produce data source entries that carry forward to the testing of other functions. In testing systems prior to these embodiments, a number of global variables had to be assigned and used as points of reference of sequences of test codes. The framework described by the embodiments may use dynamic input data in real time.

In some embodiments, an entry may include a variable that is used to produce an object. Inputs and outputs may be variables and/or objects. If an output was a unique user id (UUID) number, the stored output may be the number. The number can be used to reference the actual user object in the database. Variables may represent objects somewhere else in data source 304.

Figure 5:
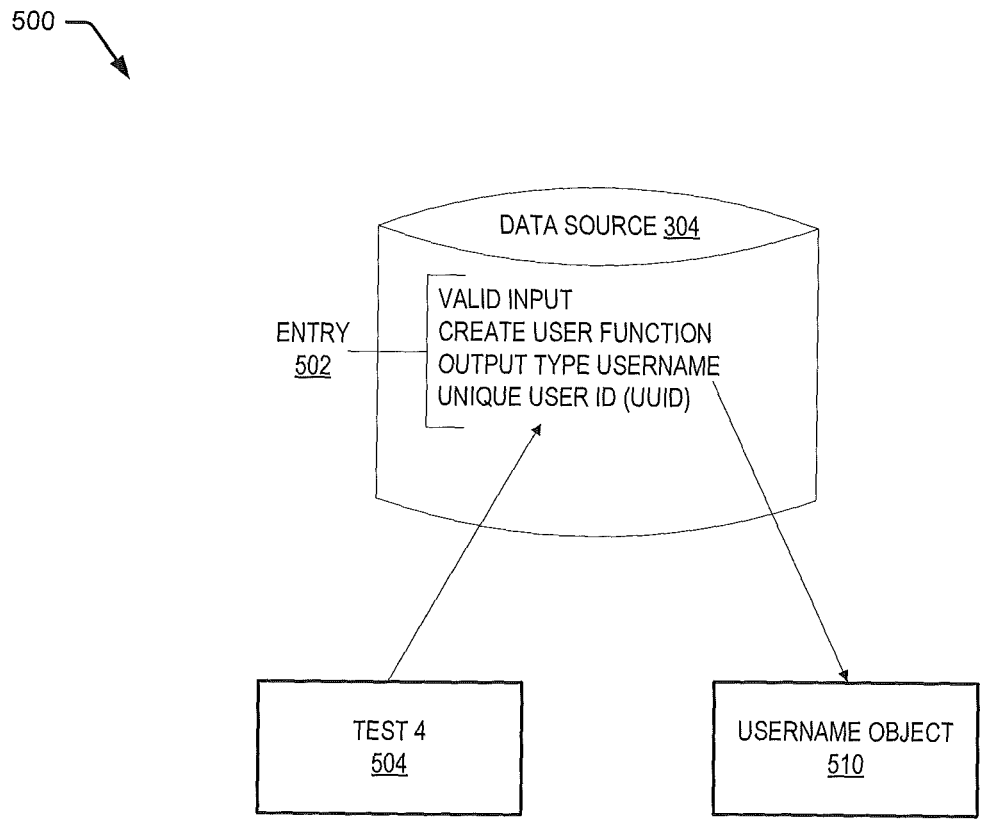
FIG. 5 illustrates a system for testing software, according to various embodiments described herein.

For example, FIG. 5 shows system 500. Data source 304 includes entry 502. Entry 502 includes a valid input and a create user function. Entry 502 may also include an output type of username and/or a unique user ID (UUID). Test 4 504 requires an input of a username. The input may search in a hash table of data source 304 and find UUID of entry 502. If the required input matches the UUID variable, test engine 302 may cause the create user function to generate a username object 510, the username object type corresponding to the UUID variable.

Some test code may involve negative tests, or tests to check for invalid inputs or planned faults. Accordingly, an "Invalid Input Hashtable" may be stored in data source 304. Entries in the invalid input hash table may include fields registered to provide tests of what occurs when the correct input is not provided. Negative tests may be performed with stored "invalid inputs" to ensure that the methods fail when they are supposed to fail.

In some embodiments, test engine 302 and/or data source 304 may operate through a browser on a node or a computing device. The browser may be any commonly used browser, including any multithreading browser.

Systems 200-300 and 500 may be implemented in computing devices coupled directly or indirectly over a network. The network facilitates wireless or wired communication between computing devices, and may communicate using, for example, IP packets, Frame Relay frames, Asynchronous Transfer Mode (ATM) cells, voice, video, data, and other suitable information between network addresses. The network may include one or more local area networks (LANs), radio access networks (RANs), metropolitan area networks (MANS), wide area networks (WANs), virtual private networks (VPNs), a portion of the global computer network known as the Internet, and/or any other communication system or systems at one or more locations.

As will be appreciated by one skilled in the art, aspects of the disclosure may be embodied as a method, data processing system, and/or computer program product. Furthermore, embodiments may take the form of a computer program product on a tangible computer readable storage medium having computer program code embodied in the medium that can be executed by a computing device.

Figure 6:
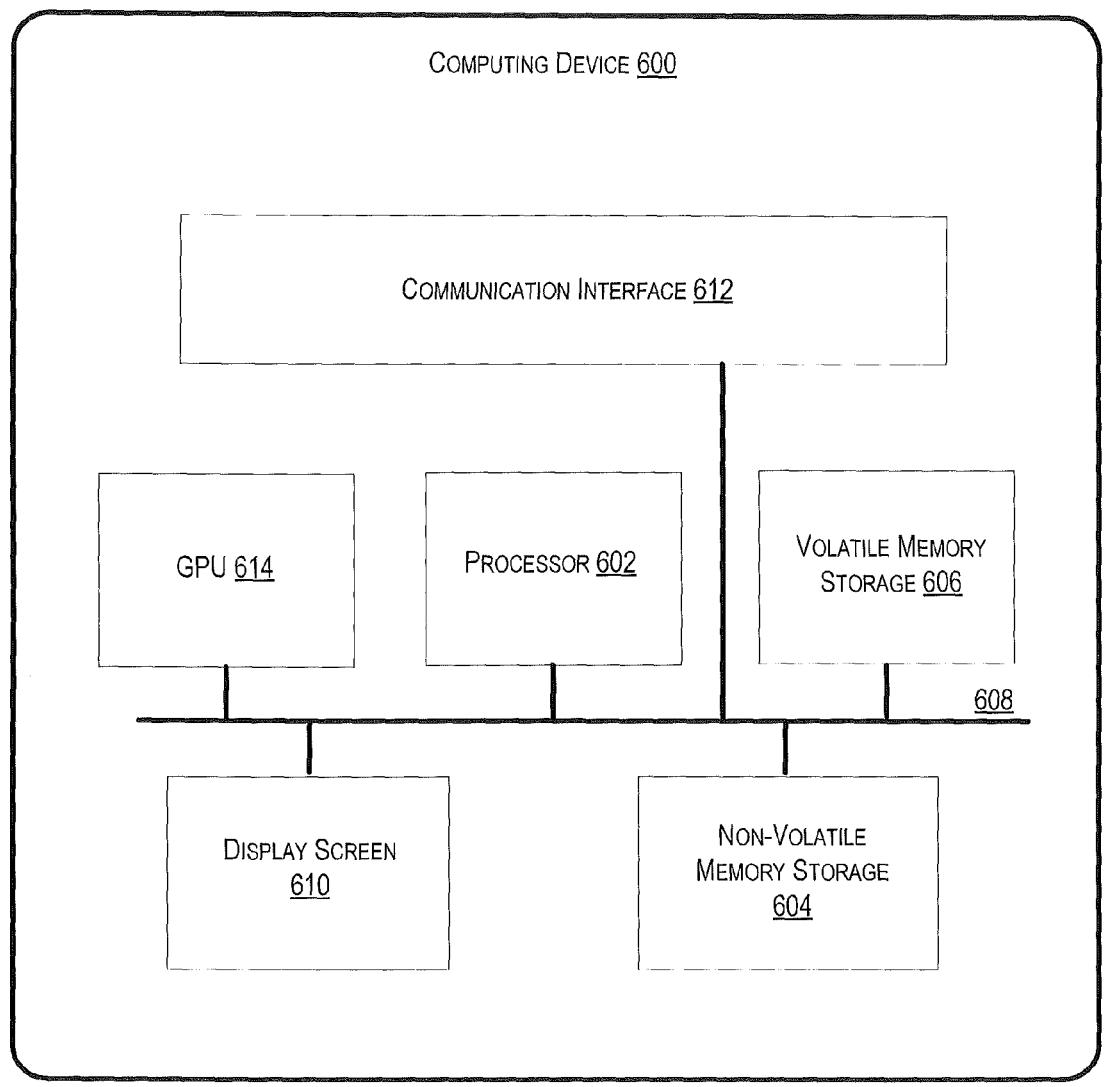
FIG. 6 is a block diagram of a computing device in which various embodiments disclosed herein can be implemented.

FIG. 6 is an example computer system 600 in which embodiments of the present disclosure, or portions thereof, may be implemented as computer-readable code. For example, the components of test engine 302, data source 304 or any other components of systems 200-300 and 500 or method 400 may be implemented in one or more computer devices 600 using hardware, software implemented with hardware, firmware, tangible computer-readable storage media having instructions stored thereon, or a combination thereof and may be implemented in one or more computer systems or other processing systems. Computer devices 600 may also be virtualized instances of computers. Components and methods in FIGS. 2-5 may be embodied in any combination of hardware and software.

Computing device 600 may include one or more processors 602, one or more non-volatile storage mediums 604, one or more memories 606, a communication infrastructure 608, a display screen 610 and a communication interface 612. Computing device 600 may also have networking or communication controllers, input devices (keyboard, a mouse, touch screen, etc.) and output devices (printer or display), among others.

Processor(s) 602 are configured to execute computer program code from memory devices 604 or 606 to perform at least some of the operations and methods described herein, and may be any conventional or special purpose processor, including, but not limited to, digital signal processor (DSP), field programmable gate array (FPGA), application specific integrated circuit (ASIC), and multi-core processors.

GPU 614 is a specialized processor that executes instructions and programs, selected for complex graphics and mathematical operations, in parallel.

Non-volatile memory storage 604 may include one or more of a hard disk drive, flash memory, and like devices that may store computer program instructions and data on computer-readable media. One or more of non-volatile memory storage 604 may be a removable storage device.

Memory devices 606 may include one or more volatile memory devices such as but not limited to, random access memory. Communication infrastructure 608 may include one or more device interconnection buses such as Ethernet, Peripheral Component Interconnect (PCI), and the like.

Typically, computer instructions are executed using one or more processors 602 and can be stored in non-volatile storage medium 604 or memory devices 606.

Display screen 610 allows results of the computer operations to be displayed to a user or an application developer.

Communication interface 612 allows software and data to be transferred between computer system 600 and external devices. Communication interface 612 may include a modem, a network interface (such as an Ethernet card), a communications port, a PCMCIA slot and card, or the like. Software and data transferred via communication interface 612 may be in the form of signals, which may be electronic, electromagnetic, optical, or other signals capable of being received by communication interface 612. These signals may be provided to communication interface 612 via a communications path. The communications path carries signals and may be implemented using wire or cable, fiber optics, a phone line, a cellular phone link, an RF link or other communications channels. According to an embodiment, a host operating system functionally interconnects any computing device or hardware platform with users and is responsible for the management and coordination of activities and the sharing of the computer resources.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, JavaScript, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computer environment or offered as a service such as a Software as a Service (SaaS).

Aspects of the present disclosure are described herein with reference to flowchart illustrations and/or block diagrams of methods, systems and computer program products according to embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall support claims to any such combination or subcombination.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein.

The breadth and scope of the present invention should not be limited by any of the above-described embodiments or any actual software code with the specialized control of hardware to implement such embodiments, but should be defined only in accordance with the following claims and their equivalents.

What is claimed is:

1. A computer-implemented method, comprising:
storing a first input, a first function and a corresponding first output type, wherein the first output type is a result of a prior execution of the first function with the first input for a first test of operation of computer code;
determining during execution of a second test of operation of computer code whether a second input type for the second test of operation of computer code matches the first output type;
selectively executing again the first function with the first input in response to a determination that the second input type matches the first output type, to generate a first output; and
performing the second test using the first output of the selectively executing again the first function as a second input.

2. The method of claim 1, further comprising:
storing the first output;
determining during execution of a third test of operation of computer code whether a third input type for the third test of operation of computer code matches the first output type;
obtaining the first output in response to a determination that the third input type matches the first output type; and
performing the third test using the first output as a third input.

3. The method of claim 2, wherein the first output is a variable which represents objects in a data source and performing the third test comprises obtaining an object of the first output type from the data source based on the variable and performing the third test using the object as the third input.

4. The method of claim 1, wherein performing the second test comprises:
executing a second function with the first output of the selectively executing again the first function as the second input; and
validating a second output of the second function.

5. The method of claim 4, further comprising:
storing the second input, the second function and a corresponding second output type, wherein the second output type is a result of the executing the second function with the second input for the second test of operation of computer code;
determining during execution of a third test of operation of computer code whether a third input type for the third test of operation of computer code matches the second output type;
selectively executing again the second function with the second input in response to a determination that the third input type matches the second output type, to generate a second output; and
performing the third test using the second output of the selectively executing again the second function as a third input.

6. The method of claim 1, wherein the first output is an object of the first output type.

7. The method of claim 1, wherein the storing the first input, the first function and the corresponding first output type comprises storing the first input, the first function and the corresponding first output type in a data source.

8. The method of claim 1, wherein the first input is an invalid input causing an expected failure of the second test.

9. A system, comprising:
a processor;
a data source; and a memory coupled to the processor and comprising computer readable program code embodied in the memory that when executed by the processor causes the processor to perform operations comprising:
  storing a first input, a first function and a corresponding first output type in the data source, wherein the first output type is a result of a prior execution of the first function with the first input for a first test of operation of computer code;
  determining during execution of a second test of operation of computer code whether a second input type for a second test of operation of computer code matches the first output type stored in the data source;
  selectively executing again a first function stored in the data source with a first input stored in the data source in response to a determination that the second input type matches the first output type, wherein executing the first function with the first input outputs a first output of the first output type; and
  performing the second test using the first output of the selectively executing again the first function as a second input.

10. The system of claim 9, the operations further comprising:
  storing the first output in the data source;
  determining during execution of a third test of operation of computer code whether the third input type for a third test of operation of computer code matches the first output type;
  obtaining the first output from the data source in response to a determination that the third input type matches the first output type; and
  performing the third test using the first output as a third input.

11. The system of claim 10, wherein the first output is a variable which represents objects in the data source and the third test comprises obtaining an object of the first output type from the data source based on the variable and performing the third test using the object as the third input.

12. The system of claim 9, wherein performing the second test comprises:
  executing a second function with the first output of the selectively executing again the first function as the second input; and
  validating a second output of the second function.

13. The system of claim 12, the operations further comprising:
  storing, in the data source, the second input, the second function and a corresponding second output type, wherein the second output type is a result from the executing the second function with the second input for the second test of operation of computer code;
  determining during execution of a third test of operation of computer code whether a third input type for the third test of operation of computer code matches the second output type;
  selectively executing again the second function with the second input in response to a determination that the third input type matches the second output type, to generate a second output; and
  performing the third test using the second output of the selectively executing again the second function as a third input.

14. A computer program product, comprising:
  a non-transitory computer readable storage medium having computer readable program code embodied in the medium that when executed by a processor causes the processor to perform operations comprising:
    storing a first input, a first function and a corresponding first output type, wherein the first output type is a result of a prior execution of the first function with the first input for a first test of operation of computer code;
    determining during execution of a second test of operation of computer code whether a second input type for the second test of operation of computer code matches the first output type;
    selectively executing again the first function with the first input in response to a determination that the second input type matches the first output type, to generate a first output; and
    performing the second test using a first output of the selectively executing again the first function as a second input.

15. The computer program product of claim 14, further comprising computer readable program code causing the processor to perform:
  storing the first output;
  determining during execution of a third test of operation of computer code whether a third input type for the third test of operation of computer code matches the first output type;
  obtaining the first output in response to a determination that the third input type matches the first output type; and
  performing the third test using the first output as a third input.

16. The computer program product of claim 15, wherein the first output is a variable which represents objects in a data source and the third test comprises obtaining an object of the first output type from the data source based on the variable and performing the third test using the object as a third input.

17. The computer program product of claim 14, wherein performing the second test comprises:
  executing a second function with the first output of the selectively executing again the first function as the second input; and
  validating a second output of the second function.

18. The computer program product of claim 17, further comprising computer readable program code causing the processor to perform:
  storing the second input, the second function and a corresponding second output type, wherein the second output type is a result from the executing the second function with the second input for the second test of operation of computer code;
  determining during execution of a third test of operation of computer code whether a third input type for the third test of operation of computer code matches the second output type;
  selectively executing again the second function with the second input in response to a determination that the third input type matches the second output type, to generate a second output; and
  performing the third test using the second output of the selectively executing again the second function as a third input.

19. The computer program product of claim 14, wherein the first output is an object of the first output type.

20. The computer program product of claim 14, wherein the first input is an invalid input causing an expected failure of the second test.

* * * * *